US010073581B2

(12) United States Patent
Moon et al.

(10) Patent No.: US 10,073,581 B2
(45) Date of Patent: Sep. 11, 2018

(54) LAYOUT DETERMINATION METHOD, LAYOUT DETERMINATION SERVER PERFORMING THE SAME AND STORAGE MEDIUM STORING THE SAME

(71) Applicant: Korea Electronics Technology Institute, Seongnam-si, Gyeonggi-do (KR)

(72) Inventors: Jae Won Moon, Seoul (KR); Tae Beom Lim, Yongin-si (KR); Seung Woo Kum, Yongin-si (KR); Jong Bin Park, Hwaseong-si (KR); Jong Jin Jung, Incheon (KR); Kyung Won Kim, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 193 days.

(21) Appl. No.: 14/598,933

(22) Filed: Jan. 16, 2015

(65) Prior Publication Data
US 2016/0147382 A1   May 26, 2016

(30) Foreign Application Priority Data

Nov. 20, 2014  (KR) .................. 10-2014-0162276

(51) Int. Cl.
*G06F 3/0481* (2013.01)
*G06F 3/14* (2006.01)
*G06F 17/30* (2006.01)

(52) U.S. Cl.
CPC ............ *G06F 3/0481* (2013.01); *G06F 3/14* (2013.01); *G06F 17/30861* (2013.01); *G06F 17/30905* (2013.01); *G06F 2203/04801* (2013.01)

(58) Field of Classification Search
CPC ............... G06F 17/30861; G06F 3/14; G06F 2203/04801; G06Q 30/02; G06Q 30/0277
See application file for complete search history.

(56) References Cited

U.S. PATENT DOCUMENTS

| 7,530,050 B2* | 5/2009 | Mohan | ...................... G06F 8/20 717/100 |
| 8,676,905 B2* | 3/2014 | Lee | ........................ H04L 5/1438 709/203 |

(Continued)

FOREIGN PATENT DOCUMENTS

| KR | 10-2012-0038326 A | 4/2012 |
| KR | 10-2014-0047219 A | 4/2014 |

OTHER PUBLICATIONS

Communication dated Oct. 26, 2015 issued by the Intellectual Property Office of Korea in counterpart application No. 10-2014-0162276.

*Primary Examiner* — Jordany Nunez
(74) *Attorney, Agent, or Firm* — Sughrue Mion, PLLC

(57) ABSTRACT

A method of organizing a user-customizable content adaptation object being performed on a user-customizable content adaptation object organizing server, the server being coupled to a user terminal, the method includes: (a) selecting a layout comprising at least one object collector; (b) generating at least one content adaptation object, each corresponding to a computer executable object and being capable of receiving a remote response by the user terminal or being applicable to the user terminal; and (c) inserting the at least one content adaptation object into the at least one object collector based on a property and a number of objects acceptable in the at least one object collector.

9 Claims, 13 Drawing Sheets

(56) References Cited

U.S. PATENT DOCUMENTS

| | | | |
|---|---|---|---|
| 9,336,337 B2* | 5/2016 | Jaquez-Vazquez | ............................ G06Q 30/0621 |
| 2007/0157082 A1* | 7/2007 | Green | ................. G06F 17/3089 715/234 |
| 2007/0204209 A1* | 8/2007 | Truelove | ........... G06F 17/30056 715/203 |
| 2010/0088605 A1* | 4/2010 | Livshin | ................. G06F 17/212 715/731 |
| 2013/0204584 A1* | 8/2013 | Jaquez-Vazquez | ............................ G06F 17/5004 703/1 |
| 2014/0108922 A1* | 4/2014 | Gravity | ................. G06F 17/212 715/246 |
| 2014/0214793 A1* | 7/2014 | Tatemura | .......... G06F 17/30306 707/713 |
| 2015/0127472 A1* | 5/2015 | Keiser | ................ G06Q 30/0275 705/14.71 |
| 2015/0193383 A1* | 7/2015 | Rao | ....................... G06F 17/212 715/243 |

* cited by examiner

| Information Of Content Adaptation Object ||
|---|---|
| ID | 35 |
| Name | Food Blog |
| Description | Food Blog, News |
| Content | http://a.com/food.html |
| Tag | Food/oriental |
| Price | 2000 |
| Property | Blog |
| Type | Webpage |
| Width | 2 |
| Height | 1 |
| ProviderName | KETI |
| Snapshot | http://:a.com/135.jpg |
| Icon | Icon_food |

FIG. 5

| type of content adaptation object | category of processed content adaptation object | format of processed content adaptation object |
|---|---|---|
| WebPage, Video, Image | BodyContent | `<div class="resource W%RscWidth H%RscHeight">`<br>`<a href="%RscContent">`<br>   `<div class="MainInfo">`<br>      `<span class="rscIcon" %RscIcon"/>`<br>      `<span class="rscName">%RscName</span>`<br>   `</div>`<br>   `<div class="SubInfo">`<br>      `<div class="rscType">%RscType</div>`<br>      `<div class="rscID">%RscID</div>`<br>      `<div class="rscProperty">%RscProperty</div>`<br>      `<div class="rscDescription">%RscDescription</div>`<br>      `<div class="rscContent">%RscContent</div>`<br>   `</div>`<br>when it is not `<div class="RscContent"/>`/*Layer1, Layer5, RscContent is deleted*/ one of 1 and 2 is selected by type as lower line.<br>      generating when it is `<iframe src="%RscContnet"></iframe>` 1) Webpage, Video<br>      generating when it is `<image src="http://m.daum.net>` type=webpage 2) Image<br>   `</div>`<br>`</a>`<br>`<div class="resource">` |
| HTML | BodyContent | `<div class="resource W%RscWidth H%RscHeight">`<br>   `<div class="SubInfo">`<br>      `<div class="rscType">%RscType</div>`<br>      `<div class="rscID">%RscID</div>`<br>      `<div class="rscProperty">%RscProperty</div>`<br>      `<div class="rscDescription">%RscDescription</div>`<br>   `</div>`<br>RscContent is deleted in Client when it is not `<div class="RscContent">`<br>/*Layer1, Layer5*/<br>      %RscContent<br><br>   `</div>`<br>`<div class="resource">` |
| CSS | Header | `<link href="%RscContent" rel="stylesheet">` |
| JavaScript | Header | `<script type="text/javascript" src="%RscContent"></script>` |
| Audio | Body | `<div class="type_audio">`<br>      %RscContent<br>`</div>` |
| Xml | Body | `<div class="type_xml resouce ID%RscID">`<br>      %RscContent<br>`</div>` |

FIG. 6

LAYOUT DETERMINATION METHOD, LAYOUT DETERMINATION SERVER PERFORMING THE SAME AND STORAGE MEDIUM STORING THE SAME

CROSS-REFERENCE TO THE RELATED APPLICATIONS

This application claims priority from Korean Patent Application No. 10-2014-0162276, filed on Nov. 20, 2014, the disclosure of which is incorporated herein in its entirety by reference.

BACKGROUND

1. Field

Methods and apparatuses consistent with exemplary embodiments of the inventive concept relate to a layout determination technology, and more particularly, to a layout determination method, a layout determination server performing the same and a storage medium storing the same inserting a content adaptation object based on a property and number of an acceptable object for each of at least one object collector being included in a determined layout to provide a user-customizable layout to a user terminal.

2. Description of the Related Art

In general, a user interface (UI) corresponds to a part of a program causing a user and a program to interact to cause the user and a computer to exchange information and a framework corresponds to a predetermined frame performing an any project on a web or a program. That is, a user interface framework corresponds to a frame organizing the user interface.

The Korean Patent Publication No. 10-2014-0019626 relates to a user interface framework for developing web applications, which can provide a user experience (UX) at a native application level in a mobile environment, provide high-usability UI widgets and application programming interfaces (APIs) when producing mobile web applications, thereby being applicable to N-screens using one source, enable a user to extend built-in widgets, and support an absolute coordinate system and a relative coordinate system at the same time when developing web applications, thereby improving user convenience.

The Korean Patent Publication No. 10-2008-0022697 relates to a dynamical UI framework and a UI implementing method based on the same and a technology based on the UI framework providing a function to dynamically download and select the user interface from a terminal. This technology may provide the flexible and dynamic UI to the user, whereby the user may dynamically change the UI of a personal information device according to individual preference and convenience.

SUMMARY

Example embodiments of the inventive concept provide a layout determination method capable of dynamically inserting a content adaptation object into a layout including at least one object collector to determine a layout.

Example embodiments of the inventive concept provide a layout determination method capable of setting a property and number of an object being acceptable to each of layout to insert a content adaptation object with a corresponding condition.

Example embodiments of the inventive concept provide a layout determination method capable of inserting into a layout based on an order priority between a content adaptation object.

Example embodiments of the inventive concept provide a layout determination method capable of generating a content adaptation object based on a context being obtained from a user terminal to the generated content adaptation object insert into a layout.

According to an aspect of an example embodiment, there is provided a layout determination method which may be performed on a layout determination server being connectable with a user terminal. The method may include: (a) selecting a layout comprising at least one object collector; (b) generating at least one content adaptation object, each corresponding to a computer executable object and being capable of receiving a remote response by the user terminal or being applicable to the user terminal; and (c) inserting the at least one content adaptation object into the at least one object collector based on a property and a number of objects acceptable in the at least one object collector.

Step (a) may include determining a type, a number and an arrangement of the object collector being included in the layout to pre-generate at least one layout.

Step (a) may include setting the property and the number of the objects acceptable in the at least one object collector.

Step (b) may include obtaining a context from the user terminal and generating the content adaptation object based on the context.

Step (c) may include: selecting a content adaptation object among the at least one content adaptation object based on a property of an object acceptable in a specific object collector; and inserting the selected content adaptation object in the specific object collector.

Here, the at least one content adaptation object may be a plurality of content adaptation objects, and step (c) may include: selecting two or more content adaptation objects among the plurality of content adaptation objects based on the property of the object acceptable in a specific object collector; determining a content adaptation object to be inserted into the specific object collector based on a priority order between the selected content adaptation objects if a number of the selected content adaptation objects is larger than a number of objects acceptable in the specific object collector; and inserting the determined content adaptation object in the specification object collector.

Step (c) may include if a number of the at least one content adaptation object to be inserted into a specific object collector is more than two, determining positions of the at least one content adaptation object based on a priority order between the at least one content adaptation object.

Step (c) may include: inserting the at least one content adaptation object into the at least one object collector to determine the layout; and provide the determined layout to the user terminal.

The method may further include inserting the content adaptation object into the at least one object collector to provide the determined layout to the user terminal.

The method may further include re-determining the layout based on a user's response received from the user terminal.

According to an aspect of another example embodiment, there is provided a layout determination server being connectable with a user terminal. The server may include: a layout selector configured to select a layout comprising at least one object collector; a content adaptation object generator configured to generate at least one content adaptation object, each corresponding to a computer executable object and be capable of receiving a remote response by the user terminal or being applicable to the user terminal; and a content adaptation object inserter configured to insert the at least one content adaptation object into the at least one object collector based on a property and a number of objects acceptable in the at least one collector.

The server may further include a layout provider configured to insert the at least one content adaptation object into the at least one object collector to determine the layout and provide the determined layout to the user terminal.

The server may further include a layout re-determiner configured to re-determine the layout based on a user's response received from the user terminal.

According to an aspect of still another example embodiment, there is provided a machine-readable non-transitory medium storing a computer program for a layout determination method being performed on a layout determination server. The server may be connectable with a user terminal, and the machine-readable non-transitory medium may have stored thereon machine-executable instructions for: (a) selecting a layout comprising at least one object collector; (b) generating at least one content adaptation object, each corresponding to a computer executable object and being capable of receiving a remote response by the user terminal or being applicable to the user terminal; and (c) inserting the at least one content adaptation object into the at least one object collector based on a property and a number of objects acceptable in the at least one object collector.

The layout determination method and related technologies according to an example embodiment may dynamically insert a content adaptation object into a layout including at least one object collector to determine a layout.

The layout determination method and related technologies according to an example embodiment may set a property and a number of objects being acceptable to each of layout to insert a content adaptation object with a corresponding condition.

The layout determination method and related technologies according to an example embodiment may insert into a layout based on an order priority between a plurality of content adaptation objects.

The layout determination method and related technologies according to an example embodiment may generate a content adaptation object based on a context being obtained from a user terminal.

BRIEF DESCRIPTION OF THE DRAWINGS

FIG. 5 is an example embodiment diagram illustrating information of a content adaptation object.

FIG. 6 is an example embodiment diagram illustrating a form being re-processed by a type of a content adaptation object.

DETAILED DESCRIPTION OF THE EXEMPLARY EMBODIMENTS

Figure 1:
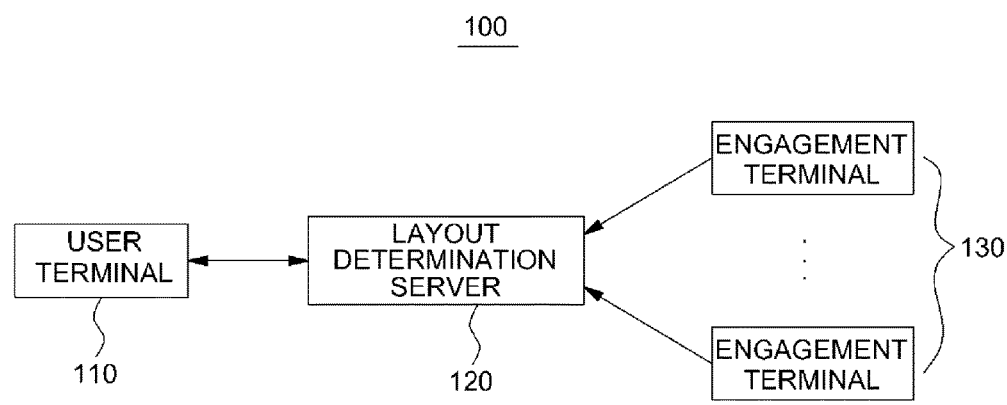
FIG. 1 is a block diagram illustrating a layout determination system according to an example embodiment.

Explanation of the inventive concept is merely exemplary embodiments for structural or functional explanation, so the scope of the inventive concept should not be construed to be limited to the embodiments explained herein. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not describe an order of respective steps. The respective steps may be changed from a mentioned order unless specifically mentioned in context. Namely, respective steps may be performed in the same order as described, may be substantially simultaneously performed, or may be performed in a reverse order.

The exemplary embodiments may be implemented as machine-readable codes on a machine-readable medium. The machine-readable medium includes any type of recording device for storing machine-readable data. Examples of the machine-readable recording medium include a read-only memory (ROM), a random access memory (RAM), a compact disk-read only memory (CD-ROM), a magnetic tape, a floppy disk, and optical data storage. The medium may also be carrier waves (e.g., Internet transmission). The computerreadable recording medium may be distributed among networked machine systems which store and execute machine-readable codes in a de-centralized manner.

The terms used in the present application are merely used to describe particular embodiments, and are not intended to limit the inventive concept. Unless otherwise defined, all terms used herein, including technical or scientific terms, have the same meanings as those generally understood by those with ordinary knowledge in the field of art to which the inventive concept belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a block diagram illustrating a layout determination system according to an example embodiment.

Referring to FIG. 1, the layout determination system 100 includes a user terminal 110, a layout determination server 120 and an engagement terminal 130. Herein, the user terminal 110 may be connected with the layout determination server 120 through a network and at least one engagement terminal 130 may be connected with the layout determination server 120 through the network 130.

The user terminal 110 may correspond to a computing device being connected with the layout determination server 120 to transceive data for performing a layout determination method. For example, the user terminal 110 may correspond to a desktop computer, a notebook, a smart phone or a tablet computer. The user terminal 110 may provide context information to the layout determination server 120 and may receive a layout from the layout determination server 120.

The layout determination server 120 may correspond to a computing device being connected with the user terminal 110 and the engagement terminal 130 to perform a specific operation. In one embodiment, the layout determination server 120 may register a content adaptation object being provided from the engagement terminal 130 and may receive a context from the user terminal 110 to generate a content adaptation object associated with the context. Also, the layout determination server 120 may insert the generated content adaptation object into a selected layout to provide a determined layout to the user terminal 110.

The engagement terminal 130 may correspond to a terminal providing the content adaptation object to the layout determination server 120 and for example, may correspond to a terminal of a designer, a service planner, an external content provider.

Figure 2:
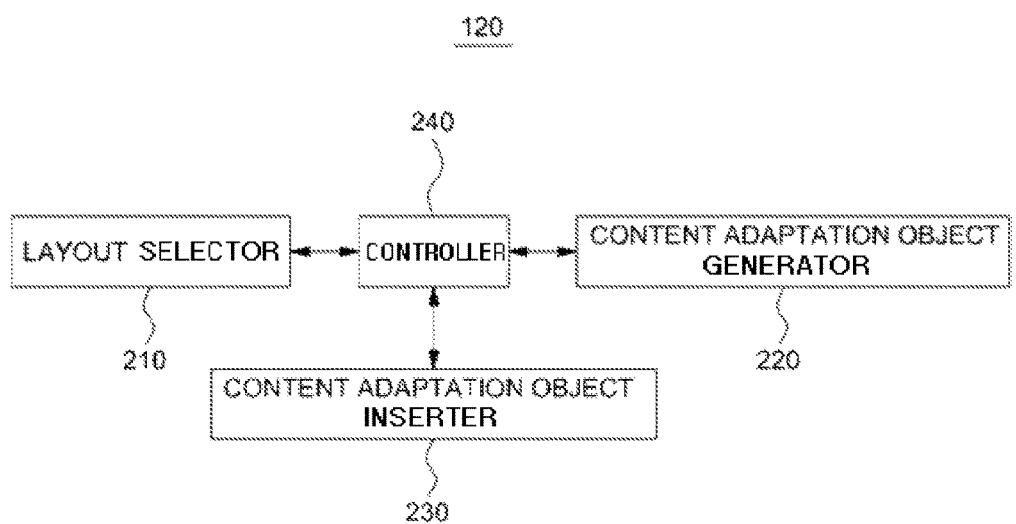
FIG. 2 is a block diagram illustrating a layout determination server in FIG. 1, according to an example embodiment.

FIG. 2 is a block diagram illustrating a layout determination server in FIG. 1.

Referring to FIG. 2, the layout determination server 120 includes a layout selector 210, a content adaptation object generator 220, a content adaptation object inserter 230 and a controller 240.

The layout selector 210 selects a layout including at least one object collector. Herein, each of the at least one object collector may include information for a property and the number of acceptable objects. In one embodiment, the layout selector 210 may receive a selection of a layout input from a user or may select a layout according to a criterion predetermined by the user.

In one embodiment, the layout selector 210 may determine a type, number and arrangement of an object collector being included in the layout to pre-generate at least one layout and may set a property and the number of objects being acceptable in each of the at least one object collector. In one embodiment, a setup content for the layout may be input by the user or may be determined according to a criterion predetermined by the user.

Below, an example for the layout will be described.

Figure 4A:
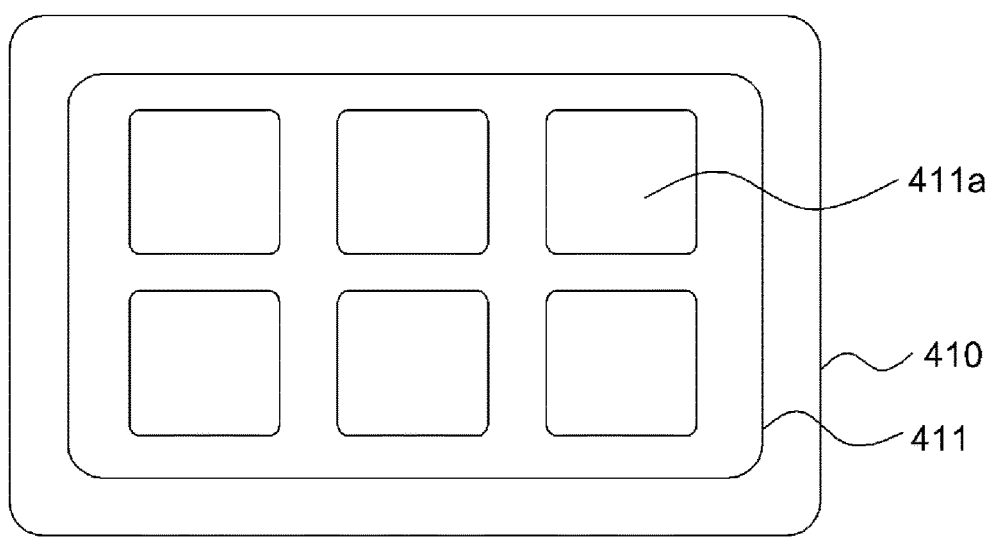
FIGS. 4A through 4E illustrate layouts according to example embodiments.

For example, referring to FIGS. 4A through 4E illustrate layouts, according to example embodiments, which can be generated through the layout selector 210. Referring to FIG. 4A, a first layout 410 may include 1 first object collector 411, the first object collector 411 may be divided into a plurality of spaces 411a where the content adaptation object is inserted. Each of the property and the number of the objects being acceptable to the first object collector 411 may correspond to {Control User Interface, Information, Application, Time, Blog} and {one~infinite}. That is, a content adaptation object corresponding to control user interface, information, application, time or blog may be inserted into the first object collector 411 of the first layout 410 and a number of the inserted content adaptation objects corresponds to a minimum one (1) through maximum infinite.

Figure 4B:
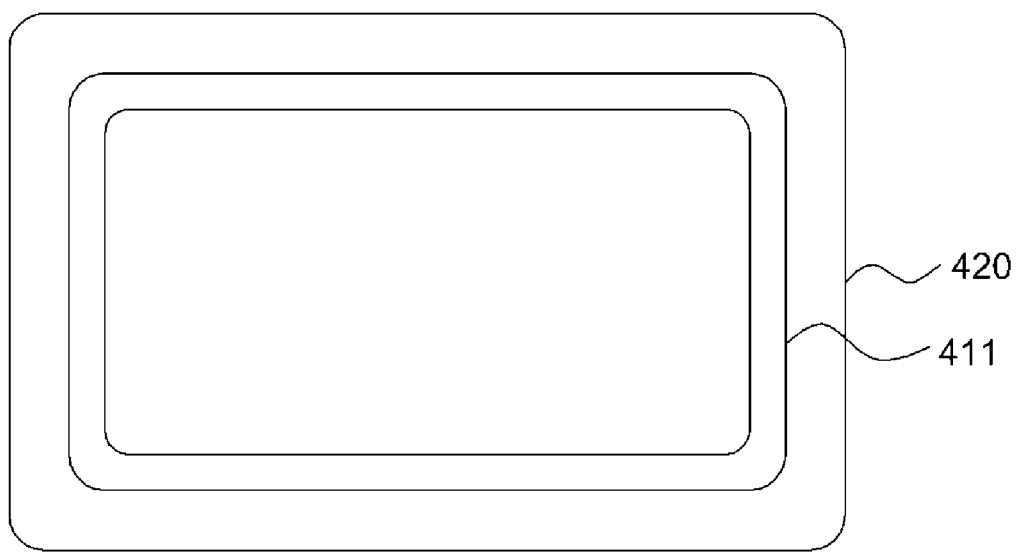

Referring to FIG. 4B, a second layout 420 may include one (1) first object collector 411 and each of the property and the number of the objects being acceptable to the first object collector 411 may correspond to {Blog, Application, News} and {one}. That is, a number of content adaptation objects corresponding to a blog, application or news being inserted into the first object collector 411 of the second layout 420 is maximum one (1).

Figure 4C:
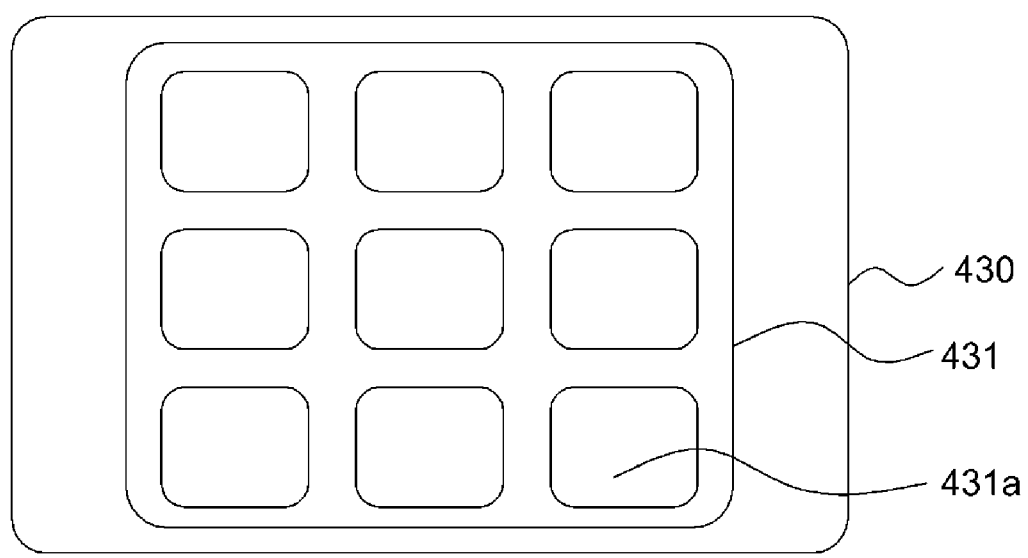

Referring to FIG. 4C, a third layout 430 may include one (1) third object collector 431 and the third object collector 431 may expose the content adaptation object with an icon type and may include a plurality of spaces 431a where the content adaptation object is inserted with the icon type. Each of the property and the number of the objects being acceptable to the third object collector 431 may correspond to {Blog, Application, Control user interface, News, Information, Internet of Things (IOT) control, Time} and {Maximum 9}. That is, a content adaptation object satisfying a property of a corresponding object may be inserted into the third object collector 431 of the third layout 430 with the icon type by maximum nine (9).

Figure 4D:
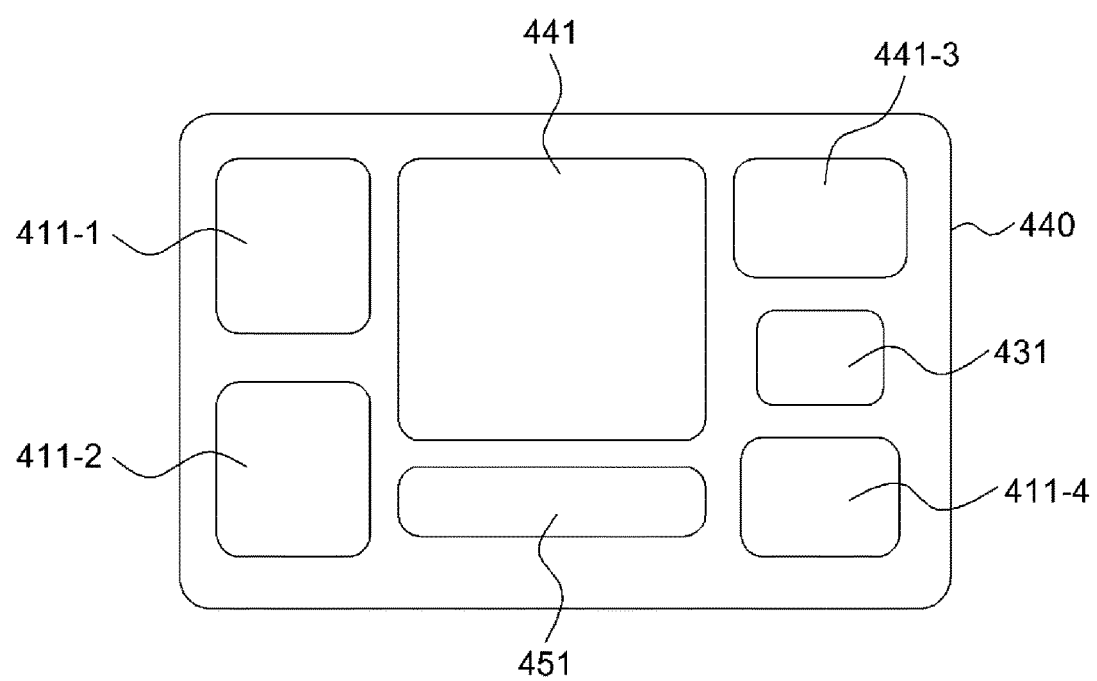

Referring to FIG. 4D, a fourth layout 440 may include four (4) first object collectors 411-1, 411-2, 411-3 and 411-4, 1 third object container 431, one (1) fourth object collector 441 and one (1) fifth object collector 451 and each of the property and the number of the objects being acceptable to each of object collectors may correspond to [Table 1].

TABLE 1

| Object collector | Number of objects | Property of object |
| --- | --- | --- |
| First object collector 411-1 | 1 | Title |
| First object collector 411-2 | 1 | Blog, Application, News, Control User Interface |
| First object collector 411-3 | 1 | Time |
| First object collector 411-4 | 1 | Information |
| Third object collector 431 | 9 | IOT control |
| Fourth object collector 441 | 6 | Blog |
| Fifth object collector 451 | 1 | Control User Interface |

Figure 4E:
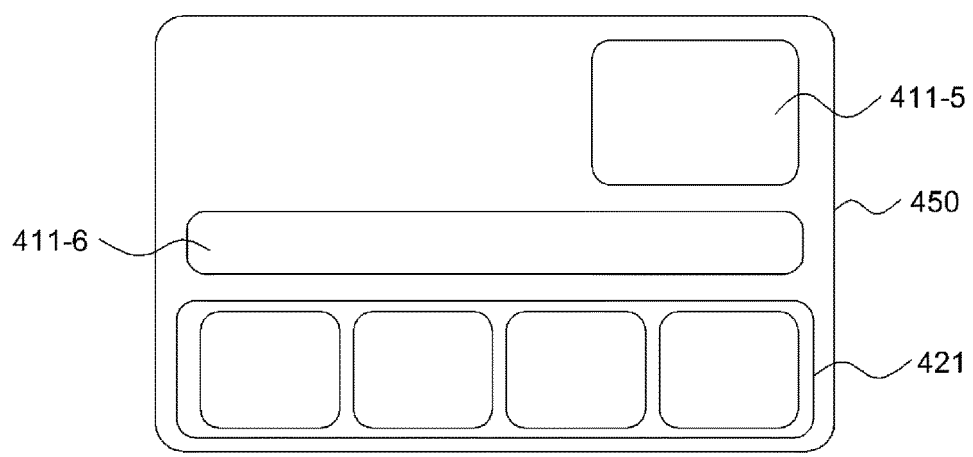

Referring to FIG. 4E, a fifth layout 450 may include two (2) first object collectors 411-5 and 411-6 and one (1) second object collector 421 and each of the property and the number of the objects being acceptable to each of object collectors may correspond to [Table 2].

TABLE 2

| Object collector | Number of objects | Property of object |
|---|---|---|
| First object collector 411-5 | 1 | Time |
| First object collector 411-6 | 4 | Control User Interface, Information |
| Second object collector 421 | 4 | IOT control, Blog, Application, News |

The content adaptation object generator 220 generates a content adaptation object. Herein, the generated content adaptation object may respectively correspond to a computer executable object and may receive a remote response by the user terminal 110 or be applied to the user terminal 110. In one embodiment, the content adaptation object generator 220 may obtain the context form the user terminal 110 and may generate the content adaptation object based on the context. Herein, the context may correspond to at least one of a type of the user terminal 110, a user profile associated with the user terminal 110, a user emotion and a user's surrounding environment.

In one embodiment, the content adaptation object may be registered from the engagement terminal 130. The engagement terminal 130 may register the content adaptation object in the layout determination server 120, and when the content adaptation object is registered, the engagement terminal 130 may input information of the content adaptation object like as FIG. 5. In one embodiment, a factor of information for the content adaptation object may be deleted or expanded. For example, referring to FIG. 5, the information of the content adaptation object may include ID, name, content, price, property or type. In more detail, the property may be classified into blog, application or control user interface and the type may be classified into webpage, HTML or XML.

The content adaptation object inserter 230 dynamically inserts the content adaptation object into the at least one object collector based on the property and the number of an acceptable objects of each of the at least one object collector. In one embodiment, the content adaptation object inserter 230 may select a content adaptation object satisfying the property of the object among a content adaptation object set based on the property of an object being acceptable in a specific object collector and may determine a content adaptation object being inserted into the specific object collector based on a priority order between the selected content adaptation object when a number of the selected content adaptation objects is larger than a number of the objects being acceptable in the specific object collector. Herein, the priority order between the selected content adaptation object may be determined according to a criterion predetermined by the user and for example, a priority order of a content adaptation object generated based on a context for the user emotion may be more highly set than that of a content adaptation object generated based on a context for the user's surrounding environment.

In one embodiment, when the number of the content adaptation objects being inserted into each of at least one object collector is more than two (2), the content adaptation object inserter 230 may determine an inserted position where the content adaptation object is respectively inserted.

In one embodiment, the content adaptation object inserter 230 may re-process the content adaptation object in a type being applicable to the user terminal 110 based on a property of the content adaptation object. The content adaptation object inserter 230 may determine a shape being re-processed according to the type of the content adaptation object when the content adaptation object is registered. Herein, the type of the content adaptation object corresponds to a type among information of the content adaptation object in FIG. 5.

For example, referring to FIG. 6, the content adaptation object may classify a re-processed category into a header, body and body content and a format being respectively re-processed for the content adaptation object may be determined. A webpage, video, image and HTML may be classified into the body content, a cascading style sheets (CSS) and JavaScript may be classified into the header and an audio and Xml may be classified into the body. Herein, a content adaptation object being classified into the body content may be redistributed for suiting with a characteristic for an object collector of a specific layout to be inserted. For example, a part of content adaptation objects classified into the body content may be classified into a header in the body content.

Below, an example for a layout determined through the content adaptation object inserter will be described.

Figure 7A:
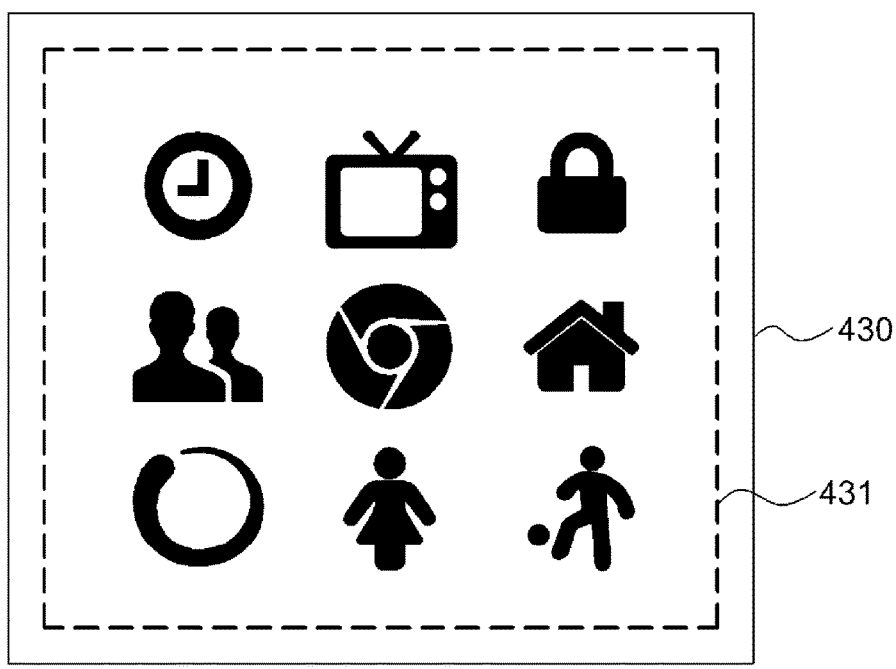
FIGS. 7A-7C illustrate layout diagrams according to an exemplary embodiments.

For example, a diagram in FIG. 7A corresponds to a layout determined based on the third layout 430 of FIG. 4C. The third layout 430 in FIG. 4C includes one (1) third object collector 431 and maximum nine (9) content adaptation objects may be included in the third object collector 431. Also, the diagram in FIG. 7A corresponds to a diagram where nine (9) content adaptation objects are inserted with the icon type.

Figure 7B:
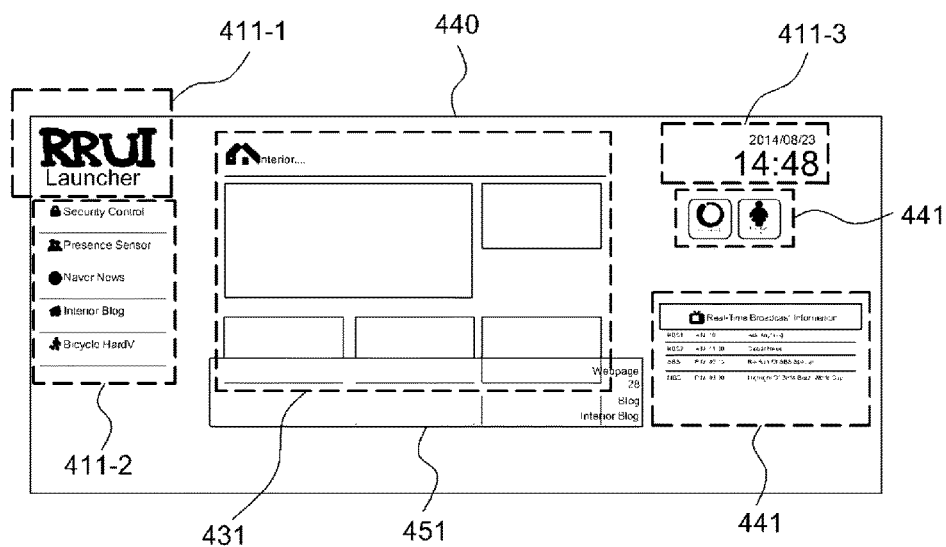

Referring to FIG. 7B, a diagram in FIG. 7B corresponds to a layout determined based on the fourth layout 440 of FIG. 4D and corresponds to a diagram where the content adaptation objects are inserted into each of a plurality of object collectors 411-1, 411-2, 411-3, 411-4, 431, 441 and 451 being included in the fourth layout 440.

Figure 7C:
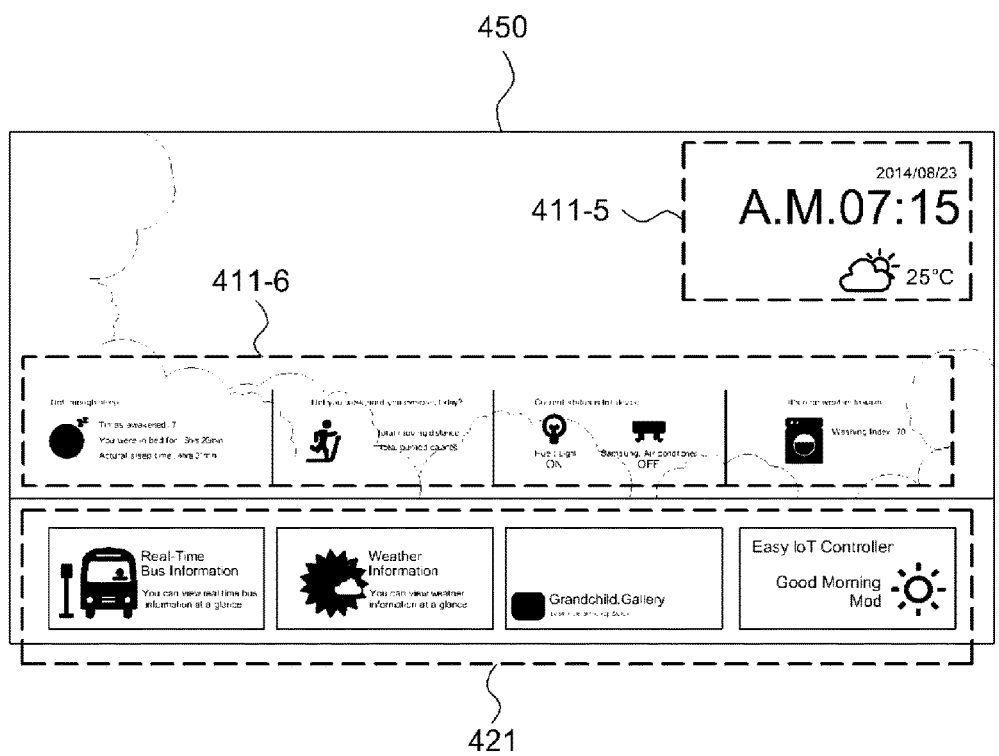

Referring to FIG. 7C, a diagram in FIG. 7C corresponds to a layout determined based on the fifth layout 450 of FIG. 4E and corresponds to a diagram where the content adaptation objects are inserted into each of a plurality of object collectors 411-5, 411-6, 421 and 451 included in the fifth layout 450.

In one embodiment, the layout determination server 120 may further include a layout provider. Herein, the layout provider may insert the content adaptation object into the at least one object collector to provide the determined layout to the user terminal 110.

In one embodiment, the layout determination server 120 may further include a layout re-determiner. Herein, when a user's response for the layout provided to the user terminal 110 is received from the user terminal 110, the layout re-determiner may re-determine a layout based on the user's response. In more detail, when the layout re-determiner receives a user's response for the provided layout, the context may be re-obtained from the user terminal 110, the content adaptation object may be regenerated based on the re-obtained context and the layout may be re-determined based on a property of the regenerated content adaptation object.

The controller 240 controls an operation and data flow of the layout selector 210, the content adaptation object generator 220 and the content adaptation object inserter 230.

Figure 3:
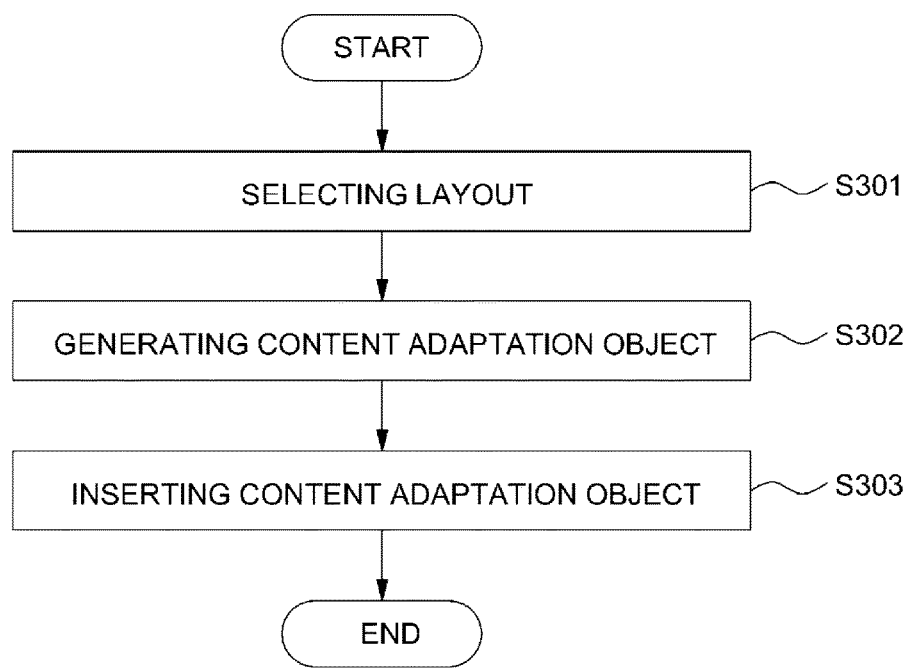
FIG. 3 is an flowchart illustrating a layout determination method being performed on a layout determination system in FIG. 1, according to an example embodiment.

FIG. 3 is an flow chart illustrating a layout determination method being performed on a layout determination system in FIG. 1.

The layout selector 210 selects a layout (Step S301). In one embodiment, the layout may selected by receiving information of a selection for the layout received from the user terminal 110 or may be automatically selected by a criterion predetermined by the user.

The content adaptation object generator 220 generates a content adaptation object based on a context obtained from the user terminal (Step S302). In one embodiment, the content adaptation object may be respectively registered in the layout determination server 120 by the engagement terminal 130 to be collected.

The content adaptation object inserter 230 inserts the content adaptation object generated through the content adaptation object generator 220 into the layout selected through the layout selector 210 (Step S303). In one embodiment, the content adaptation object inserter 230 may insert the content adaptation object based on a property and the number of the acceptable objects for each of the at least one object collector being included in the selected layout to determine the layout. Also, the content adaptation object being inserted into the layout may be respectively re-processed according to a type of the content adaptation object to be inserted into the layout.

In one embodiment, the layout providing unit may provide a determined layout in the user terminal 110 and the layout re-determiner may re-determine the layout when a response for the layout provided from the user terminal 110 is received to provide the re-determined layout to the user terminal 110.

At least one of the components, elements or units represented by a block as illustrated in FIG. 2 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although this document provides descriptions of some exemplary embodiments, it would be understood by those skilled in the art that the embodiments can be modified or changed in various ways without departing from the technical principles and scope defined by the appended claims.

What is claimed is:

1. A layout determination method performed on a layout determination server being connectable with a user terminal, the method comprising:
   (a) selecting a layout comprising at least one object collector;
   (b) generating at least one content adaptation object, each corresponding to a computer executable object, and being capable of receiving a remote response by the user terminal or being applicable to the user terminal;
   (c) inserting the at least one content adaptation object into the at least one object collector based on a property and a number of objects acceptable in the at least one object collector to determine the layout;
   (d) providing the determined layout to the user terminal; and
   (e) re-determining the layout based on a user's response received from the user terminal, wherein step (b) comprises:
   obtaining a context from the user terminal;
   generating the content adaptation object based on the context, the context comprising at least one of a type of the user terminal, a user profile associated with the user terminal, a user emotion and a user's surrounding environment; and
   registering the content adaptation object from an engaged terminal, the engaged terminal being connectable with the layout determination server;
   wherein the registering comprises inputting information of the content adaptation object, the information comprising an identification (ID), a name, a content, a price, a property and a type, wherein the property is classified into a blog, an application or a control user interface, and the type is classified into a webpage, HTML, or XML.

2. The method of claim 1, wherein step (a) comprises determining a type, a number and an arrangement of the object collector being included in the layout to pre-generate at least one layout.

3. The method of claim 2, wherein step (a) comprises setting the property and the number of the objects acceptable in the at least one object collector.

4. The method of claim 1, wherein step (c) comprises:
   selecting a content adaptation object among the at least one content adaptation object based on a property of an object acceptable in a specific object collector; and
   inserting the selected content adaptation object in the specific object collector.

5. The method of claim 4, wherein step (c) comprises:
   determining a content adaptation object to be inserted into the specific object collector based on a priority order between the selected content adaptation objects if a number of the selected content adaptation objects is larger than a number of objects acceptable in the specific object collector; and
   inserting the determined content adaptation object in the specification object collector.

6. The method of claim 1, wherein step (c) comprises, if a number of the at least one content adaptation object to be inserted into a specific object collector is more than two, determining positions of the at least one content adaptation object based on a priority order between the at least one content adaptation object.

7. The method of claim 1, wherein step (c) comprises re-processing the at least one content adaptation object according to a type being supported by the user terminal based on a property of the at least one content adaptation object.

8. A layout determination server being connectable with a user terminal, the server comprising:
   a layout selector configured to select a layout comprising at least one object collector;
   a content adaptation object generator configured to generate at least one content adaptation object, each corresponding to a computer executable object, and be capable of receiving a remote response by the user terminal or being applicable to the user terminal;

a content adaptation object inserter configured to insert the at least one content adaptation object into the at least one object collector based on a property and a number of objects acceptable in the at least one collector to determine the layout;

a layout provider configured to provide the determined layout to the user terminal; and a layout re-determiner configured to re-determine the layout based on a user's response received from the user terminal, wherein the content adaptation object generator obtains a context from the user terminal, generates the content adaptation object based on the context, the context comprising at least one of a type of the user terminal, a user profile associated with the user terminal, a user emotion and a user's surrounding environment, and registers the content adaptation object from an engaged terminal, the engaged terminal being connectable with the layout determination server, wherein the content adaptation object generator registers the content adaptation object comprises the content adaptation object generator inputs information of the content adaptation object, the information comprising an identification (ID), a name, a content, a price, a property and a type, wherein the property is classified into a blog, an application or a control user interface, and the type is classified into a webpage, HTML, or XML, and wherein at least one of the layout selector, the content adaptation object generator, and the content adaptation object inserter is implemented as a hardware component.

9. A machine-readable non-transitory medium storing a computer program for a layout determination method being performed on a layout determination server, the server being connectable with a user terminal, the machine-readable non-transitory medium having stored thereon machine-executable instructions for:

(a) selecting a layout comprising at least one object collector;

(b) generating at least one content adaptation object, each corresponding to a computer executable object, and being capable of receiving a remote response by the user terminal or being applicable to the user terminal;

(c) inserting the at least one content adaptation object into the at least one object collector based on a property and a number of objects acceptable in the at least one object collector to determine the layout;

(d) providing the determined layout to the user terminal; and (e) re-determining the layout based on a user's response received from the user terminal, wherein step (b) comprises:

obtaining a context from the user terminal;

generating the content adaptation object based on the context, the context comprising at least one of a type of the user terminal, a user profile associated with the user terminal, a user emotion and a user's surrounding environment; and registering the content adaptation object from an engaged terminal, the engaged terminal being connectable with the layout determination server;

wherein the registering comprises inputting information of the content adaptation object, the information comprising an identification (ID), a name, a content, a price, a property and a type, wherein the property is classified into a blog, an application or a control user interface, and the type is classified into a webpage, HTML, or XML.

* * * * *